(12) United States Patent
Trksak et al.

(10) Patent No.: US 9,351,508 B2
(45) Date of Patent: May 31, 2016

(54) DELAYED GELLING STARCH COMPOSITIONS

(71) Applicants: Ralph Trksak, Manville, NJ (US); Judith M Vaz, Piscataway, NJ (US); Erhan M Yildiz, Whitehouse Station, NJ (US); Matthew Joseph Yurgec, Bridgewater, NJ (US)

(72) Inventors: Ralph Trksak, Manville, NJ (US); Judith M Vaz, Piscataway, NJ (US); Erhan M Yildiz, Whitehouse Station, NJ (US); Matthew Joseph Yurgec, Bridgewater, NJ (US)

(73) Assignee: Corn Products Development, Inc., Sao Paulo (BR)

( * ) Notice: Subject to any disclaimer, the term of this patent is extended or adjusted under 35 U.S.C. 154(b) by 107 days.

(21) Appl. No.: 13/787,135

(22) Filed: Mar. 6, 2013

(65) Prior Publication Data

US 2013/0236624 A1 Sep. 12, 2013

Related U.S. Application Data

(60) Provisional application No. 61/609,267, filed on Mar. 10, 2012.

(51) Int. Cl.
*A23L 1/0522* (2006.01)
*A21D 13/00* (2006.01)
*A23C 9/137* (2006.01)

(52) U.S. Cl.
CPC .......... *A23L 1/0522* (2013.01); *A21D 13/0041* (2013.01); *A23C 9/137* (2013.01); *A23V 2002/00* (2013.01)

(58) Field of Classification Search
CPC ................ A23L 1/05223; A23V 2250/5118
USPC .................................. 426/578, 656
See application file for complete search history.

(56) References Cited

U.S. PATENT DOCUMENTS

| | | | |
|---|---|---|---|
| 5,512,311 A * | 4/1996 | Capitani et al. | 426/601 |
| 6,777,015 B2 | 8/2004 | Carver et al. | |
| 7,244,312 B2 | 7/2007 | Hanchett et al. | |
| 7,422,638 B2 | 9/2008 | Trksak et al. | |
| 2003/0108649 A1 | 6/2003 | Jeffcoat et al. | |
| 2004/0158056 A1* | 8/2004 | Hiemstra et al. | 536/47 |
| 2009/0017118 A1 | 1/2009 | Henault-Mezaize et al. | |

FOREIGN PATENT DOCUMENTS

| | | |
|---|---|---|
| EP | 1961769 A1 | 8/2008 |
| EP | 2135882 A1 | 12/2009 |

OTHER PUBLICATIONS

Homsey, Christine, "Starch: Stabilizer Solutions" in Food Product Design, Sep. 2000, p. 1-6.*

* cited by examiner

*Primary Examiner* — Elizabeth Gwartney
(74) *Attorney, Agent, or Firm* — John Daniel Wood; Karen G. Kaiser

(57) ABSTRACT

The present application is related to starches that exhibit delayed gelling. In one embodiment, the application is related to compositions of a degraded gelling starch having a stabilizing group. A delayed gelling starch comprises a starch base material and a stabilization agent. Food products may comprise the delayed gelling starch.

19 Claims, No Drawings

DELAYED GELLING STARCH COMPOSITIONS

INTRODUCTION

The present application is related to starches that exhibit delayed gelling. In one embodiment, the application is related to compositions of a degraded gelling starch having a stabilizing group.

Food systems such as yogurts, pie fillings, puddings, dairy desserts, or jellies have a thickened, set, or gel texture when prepared. For example, products such as cup-set yogurt or fruit-on-the-bottom-type (FOB) yogurts can have a gel texture. These types of food systems typically contain gelling agents and must be cooked, or at least heated, to effect gelling. Common gelling agents used for this purpose include agar, gelatin, cornstarch, pectin, carrageenan, alginate, or combinations of locust bean gum and xanthan gum.

It is known that starches and their derivatives can be used to add texture to products by means of their gelling properties. For example, acid-converted starch derivatives that are converted to a certain water fluidity level will retrograde to a gel when cooked and cooled. These include, for example, derivatives of corn, potato, tapioca, or wheat. Commercially, starch is typically converted by acid or enzyme conversion techniques. In preparing starches converted by acid treatment, the granular starch base is hydrolyzed to the required viscosity in the presence of an acid.

In converting starch by enzyme treatment, the granular starch base is slurried in water and a small amount of an enzyme such as α-amylase (e.g., about 0.02% on the starch) is added to the slurry. The slurry is then heated above the gelatinization point of the starch to form a solution. When the desired conversion is reached, the solution is pH adjusted, e.g., with acid, to deactivate the enzyme. The pH-adjusted solution is then held at the pH necessary to deactivate the enzyme for a period of at least 10 minutes. Thereafter the pH may be readjusted. The type and concentration of the enzyme, the conversion conditions, and/or the length of conversion contribute to the composition of the resultant product. Other enzymes or combination of enzymes can be used.

Hydrogen peroxide can also be used to convert or thin the starch, either alone or with metal catalysts. For example, U.S. Pat. No. 3,655,644 discloses a method of thinning derivatized starch using hydrogen peroxide and a copper ion catalyst. U.S. Pat. No. 3,975,206 discloses a method for thinning starch employing hydrogen peroxide in combination with heavy metal salt catalysts such as iron, cobalt, copper, or chromium at an acidic pH. U.S. Pat. No. 4,838,944 discloses a process for the degradation of granular starch using hydrogen peroxide and a catalytic amount of manganese salt, or in one embodiment potassium permanganate, in an aqueous slurry at a pH of 11 to 12.5 (a 'Manox' conversion). Even more recently, U.S. Pat. No. 5,833,755 disclosed a process for degrading granular starch with hydrogen peroxide. The process is performed at a temperature below the gelatinization temperature of the starch. The steps comprise providing an aqueous slurry of granular starch at a pH of 11 to 12.5, adding an effective catalytic amount of a metal complex catalyst to the aqueous slurry, and adding the hydrogen peroxide to the aqueous slurry in an effective amount to degrade the granular starch. Starches prepared in such a manner have fast gel times after cooking that may range from less than 1 hour up to 3 hours.

In preparing gelled food products for distribution and sale, manufacturers may fill the products in a liquid or solution state into cups prior to gelling. Manufacturers of such products, typically desire to have control over the gel time of the product during production such that gelling of the food product occurs after cup filling. Cup filling is conducted before gelling due to the fact that after gelling, pumping of the product irreversibly damages the gel.

In the case of typical cup-set or FOB yogurt production, manufacturers typically require fermentation rooms where the cups containing the yogurt are stored until fermentation is complete. The cups are kept stationary during such fermentation. During the stationary fermentation, the resulting gel texture of yogurt forms due to casein aggregation when the pH reaches the iso-electric point. Further, if a manufacturer wants to use stirred yogurt equipment to make cup-set yogurt, instead of using a fermentation room, they will not be successful with current fast or instant gelling starches or hydrocolloids, because these tend to set before the yogurt is pumped into the cups. Accordingly, manufacturers desire to use a gelling composition that does not gel during the course of yogurt making and filling, and enable manufacturers to delay/control gel formation, and reach a cup-set texture, only after cup filling. Such a gelling composition would allow manufacturers to use stirred yogurt equipment in cup-set yogurt manufacturing, without the need for cup-set fermentation rooms, and provide flexibility to manufacturer's processing in that they can hold the fermented mass longer in vats before sending it to packaging lines, and they can hold cooked dairy mix longer before fermenting it without having to worry about gelling of starch.

SUMMARY

In one aspect the application provides a gelling composition comprising: a fluid; from about 0.25 wt % to about 6 wt % of a delayed gelling starch comprising a reaction product of a converted starch base material and a stabilization agent; and from about 0 wt % to about 5 wt % of a viscosifier; wherein: the gelling composition exhibits a delay in gelling of at least 1 hour compared to the same gelling composition in which the delayed gelling starch has been replaced with the same converted starch base but without the stabilization agent; and the total wt % of the delayed gelling starch and the viscosifier does not exceed about 6 wt %.

DETAILED DESCRIPTION

Delayed gelling starches are provided herein which exhibit controlled or tailored gelling times in comparison to conventionally prepared starches. The delayed gelling starches allow for intermediary processing steps, packaging, or the like to occur without breaking or degradation of the starch gel network, or other gelling agents, after gelling is initiated or completed. Thus, processing of the product having a delayed gelling starch may comprise the filling of a container, in which the product then gels. Such delayed gelling starches may be used in, for example, stirred yogurt processes, where the yogurt is fermented prior to cup filling, but where the yogurt gels after cup filling, to provide a cup-set texture after packaging.

In one aspect, a composition is provided comprising a converted starch base material substituted with a stabilization agent, wherein the composition is a delayed gelling starch. In some embodiments, the stabilization agent comprises propylene oxide, acetic anhydride, octenyl succinic anhydride, succinic anhydride, sodium orthophosphate, sodium tripolyphosphate, sodium hypochlorite, or mixtures of any two or more thereof. In some embodiments, the converted starch base material comprises the reaction product of a starch with an oxidizing agent in the presence of a base. In some embodiments, the converted starch base material comprises the reaction product of a starch with an enzyme. In some embodiments, the converted starch base material comprises the reaction product of a starch with an acid, where the starch is selected from the group consisting of sago starch, mung bean starch, sweet potato starch, and pea starch. In some embodiments, the converted starch base material has a viscosity of from about 20 mPa·s to about 80 mPa·s as measured in the Bohlin viscosity test.

In some embodiments, the converted starch base material is prepared by suspending a native starch in water to form a suspension, heating the suspension, adjusting the pH of the suspension to a value greater than 9 to form an alkaline starch solution, and adding an oxidizing agent to the alkaline starch solution.

In any of the above compositions, the delayed gelling starch exhibits a gel time greater than a gel time of the same starch which was not substituted. In some embodiments, the gel time of the delayed gelling starch is at least two times greater than the gel time of a non-substituted starch base material. In other embodiments, the gel time of the delayed gelling starch is from three to thirty times greater than the gel time of a non-chemically substituted starch base material. In any of the above embodiments, the delayed gelling starch may produce a self-supporting gel.

Any of the above compositions may also, optionally, comprise a cross-linking agent. In some embodiments, the cross-linking agent comprises phosphorus oxychloride, epichlorohydrin, linear dicarboxylic acid anhydrides, acrolein, or soluble metaphosphates.

In another aspect, a comestible is provided comprising any of the above compositions of delayed gelling starch. The comestible may be, in some embodiments, a pudding formulation, a yogurt formulation, a neutral dairy dessert, a fermented dairy dessert, a sour cream, or a retorted food.

In another aspect, a process is provided for preparing a delayed gelling starch. The process comprises suspending a native starch in water to form a suspension; adding a first oxidizing agent to the suspension; raising the pH of the suspension to from about 8 to about 13 by addition of a base; adding a second oxidizing agent to the suspension to form a starch base material; adding a stabilization agent to the starch base material to form a stabilized starch base material; and neutralizing the stabilized starch base material by addition of an acid.

In another aspect, a process is provided of preparing a delayed gelling starch comprises suspending a native starch in water to form a suspension; adding an acid to the suspension; adjusting the pH to a value from about 8 to about 12 to form a starch base material; adding a stabilization agent to the starch base material to form a stabilized starch base material; and neutralizing the stabilized starch base material by addition of an acid.

In one embodiment, the process of preparing a delayed gelling starch further comprises a hold time after the initial addition of acid but before adjusting the pH to a value from about 8 to about 12.

In another aspect, a gelling composition comprises a fluid; from about 0.25 wt % to about 6 wt % of a delayed gelling starch, the delayed gelling starch comprising a reaction product of a converted starch base material and a stabilization agent; and from about 0 wt % to about 5 wt % of a viscosifier; and wherein: the gelling composition exhibits a delay in gelling of at least 1 hour compared to a gelling composition having the same converted starch base material, but without the stabilization agent; and the total wt % of the delayed gelling starch and the viscosifier does not exceed about 6 wt %. In some embodiments, the fluid comprises water, milk, whey, skim milk powder (SMP), whey protein concentrate (WPC), whole milk powder (WMP), stock or broth, such as, but not limited to, chicken or beef or vegetable, or other proteins such as plant proteins. In any of the above embodiments, the gelling composition may comprise about 0 wt % of the starch viscosifier and from about 3 wt % to about 6 wt % of the delayed gelling starch. In any of the above embodiments, the gelling composition may comprise from about 0.25 wt % to about 5 wt % of the starch viscosifier and from about 0.25 wt % to about 4 wt % of the delayed gelling starch. In any of the above embodiments, the fluid may also comprise sugar, high fructose corn syrup, high intensity sweetener, coloring agent, flavoring, yogurt culture, cream, or a mixture of any two or more thereof.

In any of the above embodiment, the stabilization agent comprises propylene oxide or acetic anhydride. In any of the above embodiments, converted starch base material comprises starch that has been reacted with an acid, starch that has been reacted with an enzyme, or starch that has been reacted with an oxidizing agent. In any of the above embodiments, the starch comprises sago starch, mung bean starch, sweet potato starch, or pea starch.

In any of the above embodiments, the converted starch base material has a viscosity of from about 40 mPa·s to about 400 mPa·s as measured in the Bohlin viscosity test. In any of the above embodiments, the starch viscosifier comprises waxy starch, acetylated starch, hydroxypropylated starch, or cross-linked waxy starch. Such illustrative starch viscosifiers comprise, but are not limited to, dent corn starch, tapioca starch, rice starch, waxy rice starch, potato starch, or waxy potato starch.

In another aspect, the gelling composition is a comestible. In some embodiments, the comestible is yogurt or pudding.

The conversion of the starch enhances the gel strength of the starch, while the chemical substitution provides the delay in formation of the self-supporting gel, as compared to a non-chemically substituted starch. The amount of stabilizer may range from about 0.5 wt % to about 4 wt %. In one embodiment, the stabilizer is propylene oxide and it is added to the converted starch base material from about 0.5 wt % to about 2 wt %. In another embodiment, the stabilizer is acetic anhydride and it is added to the converted starch base material from about 1 wt % to about 4 wt %.

The delayed gelling starches exhibit in solution a relatively long gelling time in comparison to the non-chemically substituted starch. For example, the delayed gelling starch may exhibit a gelling time that is at least two times greater than the gelling time of the converted starch base material. In some embodiments, this comprises a gelling time that is at least three times greater than the gelling time of the converted starch base material. This also comprises a gelling time that is from three to thirty times greater than the gelling time of the converted starch base material. This also comprises a gelling time that is from two to thirty times greater than the gelling time of the converted starch base material. This also comprises a gelling time that is from two to twenty times greater than the gelling time of the converted starch base material.

The delayed gelling starches may be used in the preparation of food products that are gelled by other means such as with casein, as noted above, or with starches, in order to give the manufacturer of control over when the food product gels. For example, they can be used to rebuild the gel network in case casein network is partially/completely destroyed. The time to gelling of a food product which incorporates the delayed gelling starch may be delayed from the typical 1 to 3 hours for a standard gelled food product, to 3 hours, to 12 hours, or even to 24 hours. This provides the food product manufacturer a greater degree of flexibility in operations, allowing downtime for power failures, allowing time to repair or replace equipment during production runs, or to account for limited packaging capacity with larger production batches. In short, such delayed gelling starches provide manufacturers the ability to control the time when the food product will set to a gel, thereby providing convenience and flexibility to the manufacturer.

Thus, in a first aspect, a delayed gelling composition is provided, the composition comprising a fluid and a delayed gelling starch, where the delayed gelling starch comprises a converted starch base material substituted with a stabilization agent and where the composition exhibits a delay in gelling time compared to the fluid with the converted starch base material that is not substituted with a stabilization agent. The converted starch base material may be optionally cross-linked to form a cross-linked converted starch base material. The stabilization agent may comprise, but is not limited to, propylene oxide, acetic anhydride, octenyl succinic anhydride, succinic anhydride, sodium orthophosphate, sodium tripolyphosphate, or sodium hypochlorite. The fluid may comprise fluids used in the preparation of food products. For example, the fluid may comprise water, milk, whey, soups, stocks, fruit extracts, salt solutions, sugar solutions, or the like. The amount of delayed gelling starch in the fluid may vary according to the desired gel strength, from just a set gel (a bodied fluid) to a firm, self-supporting gel.

The gelling time is also dependent upon the amount of gelling starch that is used. The amount of the delayed gelling starch in the composition may be from about 0.25 wt % to about 6 wt %. In any of the above embodiments, the amount of the delayed gelling starch in the composition may be from about 3 wt % to about 6 wt %. In any of the above embodiments, the amount of the delayed gelling starch in the composition may be from about 3 wt % to about 4 wt %.

The delayed gelling compositions may optionally comprise a viscosifier. Such viscosifiers may include, but are not limited to, waxy starch, cross-linked waxy starch, cross-linked and substituted waxy starch,n acetylated starch, hydroxypropylated starch, or other hydrocolloids. For example, illustrative viscosifiers includes, but are not limited to, dent corn starch, tapioca starch, rice starch, waxy rice starch, potato starch, waxy potato starch, guar gum, pectin, locust bean gum, or xanthan gum. The viscosifiers may be added for handling purposes, for formulation optimization, or for increasing the effective concentration of delayed gelling starches. Thus, in some embodiments, the delayed gelling compositions may comprise from about 0 wt % to about 5 wt % of a viscosifier. Because the amount of viscosifier is optional, in some cases, the delayed gelling composition contains about 0 wt % of the viscosifier. While in other cases, the delayed gelling composition contains from about 0.25 wt % to about 5 wt % of the viscosifier. For example, this comprises from about 0.5 wt % to about 3 wt % of the viscosifier.

In order to obtain the proper consistency and mouth-feel of a comestible that comprises the delayed gelling compositions, the total amount of delayed gelling starch and viscosifier is typically less than about 6 wt %. Thus, in some embodiments, the gelling composition comprises about 0 wt % of the viscosifier (optional) and from about 3 wt % to about 6 wt % of the delayed gelling starch. For example, this comprises about 0 wt % of the viscosifier and from about 3 wt % to about 4 wt % of the delayed gelling starch. In other embodiments, the gelling composition comprises from about 0.25 wt % to about 5 wt % of the viscosifier and from about 0.25 wt % to about 4 wt % of the delayed gelling starch, but where the total amount of viscosifier and delayed gelling starch does not exceed about 6 wt %. In other embodiments, the gelling composition comprises from about 0.5 wt % to about 3 wt % of the viscosifier and from about 0.25 wt % to about 3 wt % of the delayed gelling starch.

The delayed gelling compositions may be used in food products where a gelled texture is desirable for taste, packaging, texture, or "mouth-feel." For example, the compositions may be used in products such as puddings, yogurts, pies, crèmes, or the like. The delayed gelling starches have a low initial viscosity which allows for processing of products containing the starches and the filling of containers, while the products are freely flowing and in a liquid state. After processing, or the filling of containers, gelling of the starch occurs. The delay in gelling is a time-related phenomenon, whereby the stabilization agent acts to stabilize the converted starch from gelling. Gelling eventually occurs between the filling of the containers and arrival of the product at the point of sale. Thus, the delayed gelling compositions may also comprise additives such as sugars, high fructose corn syrup, high intensity sweeteners, coloring agents, flavorings, yogurt cultures, creams, or a mixture of any two or more such additives.

The starch base material of the present composition is a degraded starch material, or in other words, a native starch that has undergone treatment to reduce the molecular weight of the starch molecules. To degrade a native starch to the starch base material, the native starch is typically suspended in water to form a slurry. To degrade using an oxidant, the slurry is heated and the solution is made alkaline by the addition of a base to form an alkaline solution. An oxidizing agent is then added to the alkaline solution to oxidize, and partially hydrolyze, the starch. In addition to oxidation, treatment with acid or enzyme can also be utilized. The product from this process is the starch base material. The degradation of the starch is done to provide a converted starch base material of a pre-determined viscosity, or range of viscosity. One illustrative conversion of a native starch to a starch base material is set out in U.S. Pat. No. 4,838,944.

As noted above, the starch is degraded, or "thinned" to a converted starch base material of a pre-determined viscosity. The viscosities referred to and reported herein are determined using a Bohlin Visco 88, and are reported in terms of mPa·s (millipascal-seconds). For example, the converted starch base material may have a viscosity from about 40 mPa·s to about 400 mPa·s. In some embodiments, the converted starch base material has a viscosity from about 100 mPa·s to about 250 mPa·s. It is recognized that viscosity is the resistance that a material has to change in form, with that material increasing in resistance as it increases in viscosity. The viscosity of native and modified starches is measured during controlled heating and cooling.

For viscosity determination in terms of mPa·s, the viscosity is determined using a Bohlin Visco 88 viscometer, available from Malvern Instruments Limited, Worcestershire UK. The Bohlin Visco 88 is a rotation viscometer that measures viscosity by determining the torque required to rotate the inner cylinder due an object in the fluid, i.e. the converted starch base material. To determine the viscosity, predetermined solids percentages and temperatures are used to provide a consistent set of conditions for comparison. For example, the viscometer is first standardized using a water jacket at 30° C. and calibrated with a standard oil having a viscosity of 100 mPa·s. The procedure for measuring the viscosity of the converted starch base material comprises adding the required amount of converted starch (e.g., 10 g, dry basis) to a stainless steel cup and adding distilled water (14 g) to make a paste. A 20% CaCl$_2$ solution (100 grams) is then added to the paste and the mixture is heated in a 100° C. water bath for 30 minutes, with rapid stirring during the initial 2 minutes. The starch dispersion is then brought to the final weight (124 g) with 90° C., or hotter, distilled water. The sample is immediately transferred to the viscometer cup, which is then placed into the Bohlin Visco 88 unit and analyzed for its viscosity at 90° C. The viscosity is reported as mPa·s.

The viscosity of the starch base material is dependent upon the degree of conversion of the native starch. The degree of conversion is dependent upon the amount of oxidation agents or acidic treatment, the temperatures used, the identity of the native starch, and/or the pH of the solutions. For sago starches, such converted starches (i.e. the starch base material) are described in U.S. Pat. No. 7,422,638.

Suitable native, or unmodified, starches that may be used to prepare the starch base material comprise those starches having from about 15 wt % to about 80 wt % amylose. In some embodiments, the starch base material comprises those starches having from about 18 wt % to about 35 wt % amylose. In some embodiments, the native starch is sago starch, mung bean starch, sweet potato starch, or pea starch. In some embodiments, the starch is a sago starch.

Native sago starch is extracted from the pith of the sago palm tree, while the other starches are extracted from their respective sources of mung beans, sweet potatoes, or peas. Any starch or starch blends having suitable properties for use herein may be purified, either before or after any modification or conversion, by any method known in the art to remove starch off flavors, odors, or colors that are native to the starch or created during processing. Suitable purification processes for treating starches are disclosed in the family of patents represented by European Patent No. 554 818. Alkali washing techniques are also useful and described in the family of patents represented by U.S. Pat. Nos. 4,477,480 and 5,187,272. The starch may be alkali washed with an alkaline earth-metal hydroxide such as sodium hydroxide. Such washing may occur before degrading of the starch.

Suitable bases for use in the conversion comprise any known bases which include, but are not limited to, alkali metal oxides, alkali metal hydroxides, alkaline earth metal oxides, alkaline earth metal hydroxides, amines, or a mixture of any two or more such bases. For example, the base may include, but is not limited to, bases such as sodium hydroxide and potassium hydroxide. Where the delayed gelling starch is to be used in a comestible, the base should be one that is suitable for consumption.

As noted above, the compositions comprise a converted starch base material that is reacted with a stabilization agent. The converted starch base material may be optionally reacted with a cross-linking agent. The stabilization agent is one which acts to delay gelling of the starch base material. The converted starch base material that is reacted with the stabilization agent may be referred to as a "substituted converted starch," or "substituted converted starch base material." Thus, by corollary, the converted starch base material prior to reaction with the optional cross-linking agent or stabilization agent may be referred to as a "non-substituted converted starch," or "non-substituted converted starch base material." Illustrative stabilization agents include, but are not limited to, ethylene oxide, propylene oxide, acetic anhydride, octenyl succinic anhydride, succinic anhydride, sodium orthophosphate, sodium tripolyphosphate, or sodium hypochlorite. When the stabilization agent is propylene oxide, the process of reaction of the propylene oxide with the starch base material is termed hydroxypropylation. When the stabilization agent is acetic anhydride, the reaction is called acetylation.

Once a solution of the starch base material is formed, the pH of the solution may be adjusted to a suitable value, prior to addition of the stabilization agent. For example, where the stabilization process comprises hydroxypropylation, the suitable pH is basic. A suitable basic pH may be about 12. Where the stabilization process comprises acetylation, succinylation, octenyl succinylation, the suitable pH is basic at a value of about 8. Where the stabilization process comprises hypochlorite oxidation, the suitable pH is about 11. However, where the stabilization process utilizes an orthophosphate or sodium tripolyphosphate, a dry thermal treatment of the starch is conducted by impregnating the starch with the phosphate salt at a pH from about 3 to 7. The delayed gelling starch is then recovered.

Delayed gelling starches are those starch compositions, as described herein, that delay the gelling time of a fluid solution in which they are placed or with which they are contacted, when compared to the converted starch base material from which they are produced. The starch base materials described above are primarily rapid gelling starches, having a time to initiate gelling of up to 3 hours after cooling to room temperature. Thus, the delayed gelling starches exhibit a gel time that is greater than a gel time of the same starch which was not substituted. In some embodiments, the delay is at least one hour after cooling of the starch base material. For example, the delay in gelling of the delayed gelling starch may be from about 1 hour to about 48 hours after cooking of the starch base material is completed.

Optionally, cross-linking agents may also be included in the delayed gelling starch compositions. The cross-linking agents are capable of forming linkages within the starch granule, thereby providing additional structural rigidity to the gel as it forms. Cross-linked granules provide particulate materials that reinforce the gel, which is primarily created by the retrogradation or recrystallization of the amylose molecules released from the swollen granules during the cooking of the starch. The cross-linking agent may be added before or after conversion of the starch base material, before the stabilization agent is added, or after the stabilization agent is added. In some embodiments, the cross-linking agent is added after the stabilization agent is added to the converted starch base material, but before the pH is adjusted to acidic values.

Where used, suitable cross-linking agents are those approved for use in foods, such as, but not limited to, epichlorohydrin, linear dicarboxylic acid anhydrides, phosphorus oxychloride, acrolein, or soluble metaphosphates. Other cross-linking agents include, but are not limited to, those such as formaldehyde, cyanuric chloride, diisocyanates, divinyl sulfone, or the like may also be used if the product is not to be used in food. In one embodiment, the cross-linking agent is phosphorus oxychloride, epichlorohydrin, sodium trimetaphosphate (STMP), or adipic-acetic anhydride. In one embodiment, the cross-linking agent comprises phosphorus oxychloride.

In one embodiment, the addition of the cross-linking agent to the delayed gelling starch is carried out at a temperature from about 5° C. to about 60° C. In some embodiments, cross-linking of the delayed gelling starch is carried out at a temperature from about 20° C. to about 45° C. Use of temperatures above about 60° C. is undesirable, since granule swelling, filtration difficulties, or gelatinization of the starch can result therefrom. Further, it is desirable that the delayed gelling starch retains granular form until it is gelatinized during processing of the comestible or other end product, the delayed gelling starches are not pre-gelled, but rather they are maintained as a "cook-up" type. A cook-up starch is defined as one which still retains its Maltese cross when stained with iodine and viewed under a plane polarized microscope. Reaction time will vary depending on the cross-linking agent and temperature used, and is typically from about 0.2 hours to about 16 hours. After completion of the cross-linking reaction, the reaction mixture is pH adjusted to a value from about 5 to about 6.5 using a common acid or base as necessary. The granular product can be recovered by filtration, washed, and dried.

Where cross-linking agents are used in the delayed gelling starches, the amount of cross-linking agent which gives a product having the characteristics defined herein will vary depending on, for example, the degree of conversion of the starch, the type of cross-linking agent used, the concentration of the cross-linking agent, the reaction conditions, and/or the necessity for having a cross-linked starch that falls within a specified range of cross-linking as determined by its viscosity characteristics. One skilled in the art will recognize that it is not the amount of cross-linking agent added to the reaction vessel that determines the properties of the final product, but rather the amount of reagent that actually reacts with the starch, as measured, for example, by the viscosity determination. In one embodiment, the amount of cross-linking agent used for reaction will vary from about 0.01% to about 0.5% by weight, depending on the degree of conversion of the starch. The type of cross-linking agent used can result in a larger or smaller amount employed. However, where cross-linking agents are used, the amount of cross-linking agent is typically greater than 0.005% by weight.

In another aspect, a process of preparing the delayed gelling starches is provided. The basic process is set forth above in various segments, but is set forth here in different detail. The process comprises suspending the native starch in water. The ratio of starch to water may vary from about 1:3 to about 1:1 starch:water ratio, on a weight basis. In one embodiment, the starch is first slurried in an aqueous phase, yielding a slurry of approximately 40% as-is starch solids (approximately 35% dry solids). The starch is then converted as is known. For example, conversion may be via an oxidation process such as that described in U.S. Pat. No. 4,838,944. For example, in one embodiment, a first oxidizing agent, such as hydrogen peroxide, is then added to the slurried starch at a temperature greater than room temperature to form a solution. For example the temperature may be from about 30° C. to about 60° C. The amount of the first oxidizing agent is sufficient to provide a slightly positive test upon addition of potassium iodide. After achieving a slightly positive KI test, the alkalinity of the solution is then raised to basic conditions of a pH from about 8 to about 13, by addition of a base. To this mixture is added at least a second oxidizing agent, such as potassium permanganate and/or hydrogen peroxide. The reaction is allowed to continue until the oxidation agents are consumed and the mixture tests negative with KI. The product may be used as such at this point if the viscosity is appropriate, or additional oxidation may be conducted to further degrade the starch. Once a base starch material of a desired viscosity is achieved by the conversion, the pH of the mixture is adjusted to a value from about 9 to about 13, and the stabilization agent is added. The stabilization agent is typically added from about 0.1 wt % to about 5 wt % based upon the starch weight. In some embodiments, the stabilization agent is added from about 1 wt % to about 2 wt % based upon the starch weight. The reaction between the base starch material and the stabilization may be conducted at an elevated temperature. In some embodiments, the elevated temperature is from about 30° C. to about 60° C. Additional oxidizing agent may be added prior to neutralization or slight acidification of the mixture by the addition of acid, or an acid pH salt. The resulting delayed gelling starch may then be filtered, washed, and dried.

In the previous paragraph, the procedure for bringing the reaction mixture to a slightly positive KI comprises weighing 20 grams of the sample into a glass cook-up beaker, adding 80 mL of distilled or deionized water and mixing well for 20-30 seconds. After mixing, 5 drops of glacial acetic acid are added and the sample is further mixed for 5-10 seconds. 5 drops of a 15% KI solution are added, followed by additional mixing for 5-10 seconds. After standing for exactly 10 minutes, the color of the solution is noted. If the color remains the same after 10 minutes, the sample is "KI negative." If the color changes to light brown, dark brown, blue, or purple after 10 minutes, the sample is "KI positive." If the color develops a light, straw color after 10 minutes, the sample is slightly positive.

In the preparation of converted starches by acid treatment, granular, native starch is slurried to form a suspension. The starch is then hydrolyzed to the required viscosity by addition of an acid to form a solution, at a temperature below the gelatinization point of the starch (usually 50-60° C.). Illustrative acids include, but are not limited to, sulfuric and hydrochloric acid. Typically, the reaction takes place over a 8 to 16 hour period, after which the acid is neutralized with alkali (e.g., to a pH of 5.5) and the converted starch is recovered by filtration.

Any of the delayed gelling starches described above, and in the following examples, may be used in a wide variety of industrial applications including food products (i.e. comestibles), personal care products, pharmaceuticals, neutraceuticals, paper-making, agricultural products, or paints. On one embodiment, the delayed gelling starches may be used in those applications where low-viscosity starches are needed to provide a high-solids starch dispersion with a pumpable and workable viscosity. Industrial applications in which delayed gelling starches are desirable or required include paper and paperboard manufacture, the manufacture of gypsum board for dry wall construction, or textile warp sizing. One such use is in comestibles (i.e. edible products), which refers to both foods and beverages. This includes, but is not limited to, confectioneries such as starch gum candies, noodles, puddings, custards, flan, fillings such as pie fillings, imitation cheeses and cheese products, spreads such as margarine, toppings, icings, imitation fish, poultry or meat, starch balls, yogurts, gelled desserts, jellies, or egg products. One situation where the delayed gelling starches may be used in comestibles is where a fluid product is desirable for the processing or the filling of packages, but where a more viscous (gelled) material is desired for consumption. For example, the delayed gelling starches may be used in puddings, yogurts, canned foods such as pet food, dips, spreads such as margarine, toppings, icings, imitation fish, poultry or meat, starch balls, jellies, or egg products, fermented our neutral dairy desserts such as fromage frais, panna cotta, sour cream, pie fillings, fruit fillings, custards, flan, imitation cheese and cheese products, or the like.

Yogurts are but one example that highlights the advantages of a delayed gelling starch in comestibles. There are two primary types of yogurts: set-type and stirred type. Set-type yogurts are typically prepared by the following process. The raw ingredients (for example, milk, cream, sugar, flavoring, and/or other additives) are blended and pasteurized. After the required hold time for pasteurization, the ingredients are homogenized, and a bacterial culture is added. This mixture is then filled into cups, which are incubated at the required temperature in a fermentation facility, before cooling to refrigeration temperatures for shipment and sale. However, the required separate fermentation facility not only presents a rate limiting time for fermentation, but also a capital expense that can be very costly.

In comparison, a stirred-type yogurt process is very similar to the set-type; however after addition of the culture, the mixture is vat-fermented in large batches. Following vat-fermentation, the fermented yogurt is broken (e.g. the entire mixture is re-stirred or blended), cooled to refrigeration temperatures, and filled into cups. Accordingly, stirred-type yogurts avoid the need for a separate incubation/fermentation room, as the fermentation occurs within a large capacity vat. However, to achieve a cup-set like texture of the set-type yogurt, using a stirred-type process, the gel cannot form before the cups are filled. The delayed gelling starches described herein may therefore be one of the ingredients used in the process being added at any time during processing from addition with the raw ingredients, to addition during the breaking of the fermented yogurt, such that once the cups are filled, a set-type yogurt texture may be achieved.

The delayed gelling starches may also be used in low-fat and reduced protein yogurts. Milk protein content (most notably casein) plays a very significant role in determining the textural properties of a yogurt. During the fermentation of yogurt, the drop in the pH of yogurt causes casein micelles in milk protein to form a gel network, which contributes significantly to the gel-strength of a yogurt. Lowering the protein content of yogurt reduces the gel-strength, opacity and other textural properties by providing less casein available to form a gel. Without replacing this protein or adding gelling agents, the gel network will be weak. The delayed gelling starches described herein may be used to replace the protein and produce a yogurt without diminished textural or gel-strength properties.

The substituted starch may be used in any amount necessary to achieve the characteristics desired for the end use application. In one embodiment, the starch is used in an amount of at least about 1%, in another embodiment at least about 6%, and in another embodiment at least about 7%, by weight of the product. In some embodiments, the starch is used in an amount from about 1% to about 7%, by weight of the product.

DEFINITIONS

The following definitions are used in connection with the present application unless the context indicates otherwise. All parts and percentages are given by weight and all temperatures in degrees Centigrade (° C.) unless otherwise indicated. All percents used are on a weight/weight basis. The use of the terms "a" and "an" and "the" and similar referents in the context of describing the elements (especially in the context of the following claims) are to be construed to cover both the singular and the plural, unless otherwise indicated herein or clearly contradicted by context. The terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the application. Additionally, the phrase 'consisting essentially of' will be understood to include those elements specifically recited and those additional elements that do not materially affect the basic and novel characteristics of the application. The phrase 'consisting of' excludes any element not specified. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, a "converted starch base material" is a starch that has been reacted with an acid, a starch that has been reacted with an enzyme, or a starch that has been reacted with an oxidizing agent. Examples of "converted starch base materials" include, but are not limited to, those prepared from sago starch, mung bean starch, sweet potato starch, or pea starch. Such conversions are known in the art, for example in Wurzburg, O. B. "Converted Starches", in: O. B. Wurzburg ed. *Modified Starches: Properties and Uses*. Boca Raton, Fla.: CRC Press, pages 17-29. 1986.

As used herein, a "cross-linking agent" is capable of forming linkages within the starch granule, thereby providing additional structural rigidity to the gel as it forms. Examples of "cross-linking agents" approved for use in food include, but are not limited to, epichlorohydrin, linear dicarboxylic acid anhydrides, phosphorus oxychloride, acrolein, soluble metaphosphates, sodium trimetaphosphate (STMP), or adipic-acetic anhydride. Examples of "cross-linking agents" if the product is not to be used in food include, but are not limited to, formaldehyde, cyanuric chloride, diisocyanates, divinyl sulfone, or the like.

As used herein, "delayed gelling starches" are converted starches that are further reacted with a stabilizer, such that when added to a fluid solution the resulting substituted starch, or delayed gelling starch, exhibits a delay in gelling time of a solution compared to the gelling time of a solution where the converted starch without the stabilizer is added to the fluid solution. The gel times are the result of the conditions of conversion of the starch (e.g. a converted starch base material) combined with chemical substitution of the starch with a stabilizer. For example, the converted starch base material may be reacted with a stabilizer such as, but not limited to, propylene oxide or acetic anhydride, which acts to temporarily stabilize the converted starch toward gelling, resulting in the delayed gelling starch.

As used herein, "glucono-delta-lactone" or "GDL" is a food additive used as a sequestrant, an acidifier, or a curing, pickling, or leavening agent. Its IUPAC name is 3R,4S,5S, 6R)-3,4,5-trihydroxy-6-(hydroxymethyl)tetrahydro-2H-pyran-2-one.

As used herein, a "double modified starch" is a degraded starch that is then reacted with a stabilization agent. A double modified starch is one example of a delayed gelling starch.

As used herein, a "fluid" is a substance that can flow, has no fixed shape, and is not a solid or a gas. Examples of "fluids" include, but are not limited to, water, milk, whey, skim milk powder (SMP), whey protein concentrate (WPC), whole milk powder (WMP), chicken stock, beef stock, vegetable stock, stocks prepared from other proteins such as plant proteins, or the like.

As used herein, the term "gel" may refer to a wide range of physical attributes from a mere thickening or an increase in viscosity of a solution as compared to a solution that is not gelled, up to and comprising gels which are characterized as being self-supporting. A gel is more viscous than a liquid or paste, and retains its shape when left unsupported and undisturbed, i.e., is self-supporting. As used herein, the "gel time" is the time between when a starch, a converted starch, a chemically stabilized converted starch, or a food product containing any of these, is cooked and the time where a self-supporting gel is formed.

As used herein, an "oxidizing agent" is a substance or species that gains electrons in a chemical reaction. Examples of "oxidizing agents" include, but are not limited to, Potassium permanganate, hydrogen peroxide, NaOCl, ammonium persulfate, an acid, or any mixture of any two or more such agents.

As used herein, a "self-supporting gel" is one in which after cooking of the starch, cooling, and gelling, substantially retains the shape of the container in which the gel formed. It will be understood that some spreading of the gel under its own weight will occur, even where it is self-supporting. For example, as used herein, a gel is self-supporting when 40 g of 7% anhydrous starch (cooked and cooled material) is placed in a container and gelled, the gel having a depth/height of about 2.3 cm and a diameter of about 4.5 cm, and upon release from the container onto a flat surface, the gel maintains a depth/height of at least 1.5 cm or the gel spreads to a diameter of no more than 6.5 cm.

As used herein, a "stabilization agent", when added to a fluid solution of a substituted starch or delayed gelling starch the resulting substituted starch or delayed gelling starch, exhibits a delay in gelling time of a solution compared to the gelling time of a solution where the converted starch without the stabilizer is added to the fluid solution. Examples of "stabilization agents" include, but are not limited to, ethylene oxide, propylene oxide, acetic anhydride, octenyl succinic anhydride, succinic anhydride, sodium orthophosphate, sodium tripolyphosphate, sodium hypochlorite, or mixtures of any two or more thereof.

As used herein, a "triple modified starch" is a degraded starch that is then reacted with a stabilization agent and a cross-linking agent. A triple modified starch is one example of a delayed gelling starch.

As used herein, a "viscosifier" is a starch or hydrocolloids additive that functions as a thickener and increases the viscosity of the fluid and composition without gelling. Examples of a "viscosifier" include, but are not limited to, waxy starch, cross-linked waxy starch, cross-linked and substituted waxy starch, acetylated starch, hydroxypropylated starch, dent corn starch, tapioca starch, rice starch, waxy rice starch, potato starch, waxy potato starch, guar gum, pectin, locust bean gum, xanthan gum, or other hydrocolloids.

Certain specific aspects and embodiments of the present application will be explained in greater detail with reference to the following examples, which are provided only for purposes of illustration and should not be construed as limiting the scope of the application in any manner. Reasonable variations of the described procedures are intended to be within the scope of the present invention. While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention. In the following examples the phrase, "the alkalinity was then raised to XX mL 0.1N HCl" means a 50 mL sample of the reaction mixture is treated with XX mL of 0.1N HCl. If the resulting mixture was at a neutral pH, then the original reaction mixture is deemed to be at an alkalinity of XX mL 0.1 HCl.

EXAMPLES

Example 1

Measuring Starch Conversion

The degree of starch conversion (viscosity reduction) was measured by determining the viscosity in mPa·s by the following method. The converted starch viscosity was measured using a Bohlin Visco 88 Rotational Viscometer with water jacket (commercially available from Malvern Instruments, Inc., Southborough, Mass.), standardized at 30° C., with a standard oil having a viscosity of 100 mPa·s. The procedure includes adding the required amount of starch (e.g., 10 g, dry basis) to a stainless steel cup and adding distilled water (14 g) to make a paste. A 20% $CaCl_2$ solution (100 grams) is then added to the paste and the mixture is heated in a 100° C. water bath for 30 minutes, with rapid stirring during the initial 2 minutes. The starch dispersion is then brought to the final weight (124 g) with 90° C., or hotter, distilled water. The sample is then immediately transferred to the viscometer cup, which is then placed into the Bohlin Visco 88 unit and analyzed for its viscosity (in mPa·s) at 90° C.

Example 2

Preparation of a Delayed Gelling Starch which is a "Triple" Modified Sago Starch This is done by (i) converting this starch to a 123 mPa·s converted starch base material, (ii) stabilizing the converted starch base material with propylene oxide, and (iii) then cross-linking the resulting starch with phosphorus oxychloride. A slurry was prepared by suspending sago starch (1000 g) in tap water (1500 mL). The temperature of the slurry was adjusted to 42° C. in a hot water bath. The alkalinity was then raised to 30 mL 0.1N HCl (titration to neutrality of a 50 mL sample) by slowly adding a 3% aqueous NaOH solution. Potassium permanganate (2.5 g of a 2% aqueous solution) was added to the solution followed by hydrogen peroxide (2.25 g of 30% hydrogen peroxide). The reaction mixture was held for three hours until no hydrogen peroxide remained, as indicated by a negative test on a hydrogen peroxide QUANT® strip. The resulting starch was found to have a viscosity of 123 mPa·s.

The alkalinity was then increased to 64 mL using 3% NaOH. Sodium sulfate (60 g, 6 wt % on starch weight), and propylene oxide (20 g, 2 wt % on starch weight) were added, and the slurry was added to a 3.78 liter plastic bottle. The bottle was then placed in a heated tumbler which was rotated for 16 hours at 40° C. The temperature of the starch slurry was then lowered to 30° C. and $POCl_3$ (0.16 g; 0.016% on a starch weight basis) was added to the starch slurry and reacted for 0.5 hour to cross-link the starch. The pH of the starch slurry was then adjusted to 5.5 by addition of sulfuric acid (25 wt % aqueous solution). The 25 wt % aqueous solution of sulfuric acid is prepared by dissolving 25 wt % of concentrated sulfuric acid in water, e.g. 100 g conc. $H_2SO_4$ in 300 g water. The triple modified sago starch was recovered by filtration, washed with water, and air-dried.

Example 3

Preparation of a Delayed Gelling Starch which is a "Triple" Modified Sago Starch with Decreased Level of Hydrogen Peroxide Done as described in Example 2, but with a decreased level of hydrogen peroxide (0.2 g, 30%), giving a viscosity of 231 mPa·s, prior to the reaction with propylene oxide.

Example 4

Measurement of Gelling Delay Utilizing a Model Yogurt Simulation

Blends of a hydroxypropylated, cross-linked waxy corn starch (PO/POCl$_3$ waxy corn starch) and two different "triple modified" sago starches were prepared (Examples 2 and 3). A control was made for each day's run from 1.5 wt % PO/POCl$_3$ waxy corn starch, 0.3 wt % gelatin (available from Gelita) and 98.2 wt % whole milk. The dry starches (and gelatin, if present) were weighed, added dry to the whole milk in a 500 mL Pyrex beaker, and mixed to ensure a complete dispersion. The mixtures were then cooked in a hot water bath (100° C.) for 20 minutes, being hand-stirred for the first 3 minutes. After cooking, the beakers were placed in an ice water bath and cooled to 25° C., with intermittent stirring. Glucono-delta-lactone (6.75 g) was added to each beaker and the sample was hand stirred for 2 minutes. The samples were allowed to stand for 4 hours at room temperature, giving time for hydrolysis of the glucono-delta-lactone to drop the pH to 4.3-4.6. The samples were then forced through a 300 micron screen using a syringe and placed into 2 ounce plastic bottles.

The bottles were then placed in a refrigerator. Samples were monitored over 24 hours to detect gel formation. Gel formation was determined by inverting the bottle into a plastic tray, noting whether a self-supporting structure existed. The results are presented in Table 1. In Table 1, the day/sample no. refers to samples run on different days and in different groupings. The controls formed a self-supporting gel after 3-5 hours, while a number of blends containing the triple modified sago types delayed gelling until 24 hours even without the addition of gelatin.

TABLE 1

Triple Modified Starch Gelling Results

| day/sample no. | % PO/POCl$_3$ waxy corn starch | % ex. 2 | % ex. 3 | % gelatin (control) | % milk | time until self supporting yogurt was observed (hours) |
|---|---|---|---|---|---|---|
| Day 1 | | | | | | |
| 1 | 0.25 | — | 0.25 | — | 99.5 | >24 |
| 2 | 0.5 | — | 2 | — | 97.5 | 2 |
| 3 | 2 | — | 0.5 | — | 97.5 | 2 |
| 4 | 0.625 | 0.625 | — | — | 98.75 | >24 |
| 5 | 0.25 | 2 | — | — | 97.75 | >24 |
| 6 | 2 | 0.25 | — | — | 97.75 | 1 |
| 7 | 1.5 | — | — | 0.3 | 98.20 | 3 |
| Day 2 | | | | | | |
| 8 | 0.625 | — | 0.625 | — | 98.75 | >24 |
| 9 | 1.5 | — | 0.75 | — | 97.75 | 2 |
| 10 | 1.5 | 0.75 | — | — | 97.75 | 8 |
| 11 | 0.625 | — | 1.5 | — | 97.875 | 24 |
| 12 | 0.75 | — | 1.5 | — | 97.75 | 5 |
| 13 (Control) | 1.5 | — | — | 0.3 | 98.20 | 5 |
| Day 3 | | | | | | |
| 14 | 1.5 | 0.625 | — | — | 97.875 | >24 |
| 15 | 0.75 | 1.5 | — | — | 97.75 | 24 |
| 16 | 1 | 1 | — | — | 98 | 24 |
| 17 | 1.5 | — | 0.625 | — | 97.875 | 3 |
| 18 | 0.625 | — | 1.5 | — | 97.875 | 24 |
| 19 (Control) | 1.5 | — | — | 0.3 | 98.20 | 5 |

Example 5

Preparation of a Delayed Gelling Starch which is a "Double" Modified Sago Starch This was done by (i) conversion to a viscosity of 110 mPa·s and (ii) stabilization with 2% propylene oxide. A slurry was prepared by suspending sago starch (1000 g) in tap water (1500 mL). The temperature of this slurry was adjusted to 42° C. in a hot water bath. The alkalinity was then raised to 30 mL 0.1N HCl (titration to neutrality of a 50 mL sample) by slowly adding a 3% aqueous NaOH solution. Potassium permanganate (2.5 g of a 2% aqueous solution) was added to the solution followed by hydrogen peroxide (2.25 g of 30% hydrogen peroxide). The reaction mixture was held for three hours until no hydrogen peroxide remained, as indicated by a negative test on a hydrogen peroxide QUANT® strip. The resulting starch was found to have a viscosity of 110 mPa·s.

The alkalinity was then increased to 64 mL using 3 wt % NaOH. Sodium sulfate (60 g, 6 wt % on starch weight), and propylene oxide (20 g, 2% on starch weight) were added and the slurry added to a 1 gallon plastic bottle. The bottle was then placed in a heated tumbler which was rotated for 16 hours at 40° C. The pH of the starch slurry was then adjusted to 5.5 by addition by addition of sulfuric acid (25 wt %). The resulting double modified starch product was recovered by filtration, washed with water, and air-dried.

Example 6

Preparation of a Delayed Gelling Starch which is a "Double" Modified Sago Starch Using 1.5 Wt % Propylene Oxide This was done by the same procedure as Example 5, but using 1.5 wt % propylene oxide instead of 2 wt %. The product had a viscosity of 116 mPa·s.

Example 7

Measurement of Gelling Delay Utilizing the Double Modified Sago Starches (Examples 5 and 6) in a Model Yogurt Simulation Blends of a hydroxypropylated, cross-linked waxy starch (PO/POCl₃ waxy corn starch) and two different "double modified" sago starches were prepared (Examples 5 and 6). A control was made for each day's run from 1.5 wt % PO/POCl₃ waxy corn starch, 0.3 wt % gelatin (Gelita) and 98.2 wt % whole milk. The dry starches (and gelatin, if present) were weighed, added dry to the whole milk in a 500 mL Pyrex beaker, and mixed to ensure a complete dispersion. This mixture was then cooked in a hot water bath (100° C.) for 20 minutes, being hand-stirred for the first 3 minutes. After cooking, the beakers were placed in an ice water bath and cooled to 25° C., with intermittent stirring. Glucono-delta-lactone (6.75 g) was added to each sample, and the sample was hand stirred for 2 minutes. The samples were allowed to stand for 4 hours at room temperature, giving time for hydrolysis of the glucono-delta-lactone to drop the pH to 4.3-4.6. The samples were then forced through a 300 micron screen using a syringe and placed into 2 ounce plastic bottles.

The bottles were then placed in a refrigerator. Samples were monitored over 24 hours to detect gel formation. Gel formation was determined by inverting the bottle into a plastic tray, noting whether a self-supporting structure existed. The results are summarized in Table 2. The control formed a self-supporting gel after 3 hours, while a number of blends containing the double modified sago types delayed gelling from 8 to 24 hours—even without the addition of gelatin.

TABLE 2

Double Modified Starch Gelling Results

| day/ sample no. | wt % commerically available modified food starch derived from waxy maize | wt % second additive | wt % milk | second additive description | time self supporting yogurt observed (hours) |
|---|---|---|---|---|---|
| Day 1 | | | | | |
| 20 | 1.13 | 2 | 96.875 | Example 6 | >24 |
| 21 | 1.63 | 1.25 | 97.125 | Example 5 | 24 |
| 22 | 1.25 | 2.25 | 96.5 | Example 5 | >24 |
| 23 | 1.25 | 2.25 | 96.5 | Example 6 | 24 |
| 24 | 2.25 | 0.75 | 97 | Example 6 | 5 |
| 25 | 2.38 | 1 | 96.625 | Example 6 | 8 |
| 26 | 2.38 | 1 | 96.625 | Example 5 | 24 |
| 27 (Control) | 1.5 | 0.3 | 98.2 | Gelatin | 3 |
| Day 2 | | | | | |
| 28 | 1.625 | 1.25 | 97.125 | Example 6 | 5 |
| 29 | 1.875 | 1.75 | 96.375 | Example 5 | 24 |
| 30 | 1.125 | 2 | 96.875 | Example 5 | 24 |
| 31 | 1.75 | 1.5 | 96.75 | Example 5 | 24 |
| 32 | 2.25 | 0.75 | 97 | Example 5 | 5 |
| 33 | 1.75 | 1.5 | 96.75 | Example 6 | 5 |
| 34 | 1.875 | 1.75 | 96.375 | Example 6 | 5 |
| 35 (Control) | 1.5 | 0.3 | 98.2 | Gelatin | 3 |

Example 8

Evaluation of Triple Modified Sago Derivatives for Delay of Gelling in Pudding Formulations Two triple modified sago derivatives were prepared according to Example 2. One was converted to a viscosity of 322 mPa·s, using 0.005% of 30% hydrogen peroxide, reacted with 2% propylene oxide and 0.016 wt % POCl₃ (Example 2a). The other (Example 2b) was converted to a viscosity of 114 mPa·s, using 0.225% of 30% hydrogen peroxide, reacted with 2% propylene oxide and 0.016 wt % POCl₃. Puddings were then prepared according to the formulations summarized in Table 3.

The dry ingredients, for example, the commercially available, waxy corn starch, Example 2a or 2b, and the sugar, were blended well. The blended dry ingredients were added to skim milk under medium agitation and made in to a slurry. The slurry was transferred to a Groen kettle covered with aluminum foil and heated to 93° C. with agitation at 25 rpm. The temperature was held at 93° C.±2° C. for 25 minutes; after holding, the pudding was cooled for 5 minutes and cups were filled at 57 to 63° C., then chilled over ice and refrigerated at 4.4° C.

Samples for gelling time evaluation were collected in a cup sprayed with PAM® cooking spray, to facilitate the easy release of the product from the cup so that the ability of the gel to hold its shape could be evaluated. The product was evaluated at 4 hour intervals except for the overnight samples. The cups were inverted over a flat surface and the ability of the gel to retain its shape and remain as a self supporting gel was evaluated. Pudding made under conditions of Example 2a exhibited a set that was delayed for 20 hours (Example 8a), while the control gelled in 4 hours. Example 2b, having a slightly lower base viscosity, did not form a gel under similar conditions (Example 8i). This demonstrates the effect of base viscosity on the capability of forming a delayed gel.

TABLE 3

Pudding Formulations With Example 2a.

| ingredients (wt %) | Example (wt %) | | | | | | | |
|---|---|---|---|---|---|---|---|---|
| | 8a | 8b | 8c | 8d | 8e | 8f | 8g | Control |
| commercially available, waxy corn starch | 2 | 0 | 4 | 2 | 4 | 3 | 3 | 5.6 |
| Example 2a | 4 | 2 | 2 | 2 | 0 | 2 | 0 | 0 |
| sugar | 10 | 10 | 10 | 10 | 10 | 10 | 10 | 10 |
| skim milk | 84 | 88 | 84 | 86 | 86 | 86 | 87 | 84.4 |
| total | 100 | 100 | 100 | 100 | 100 | 100 | 100 | 100 |
| Cond.@ 4 hr | T | T | T | T | T | T | T | T |
| Cond. @ 8 hr | S | T | n/m | n/m | T | S | T | T |
| Cond.@ 12 hr | n/m | T | n/m | n/m | n/m | n/m | n/m | T |
| Cond. @ 16 hr | S | T | S | n/m | T | S | T | T |
| Cond. @ 20 hr | SS | T | S | n/m | T | S | T | T |
| Cond. @ 24 hr | SS | T | SS | n/m | T | TSS > 24 | T | T |

TABLE 3A

Pudding Formulations With Example 2b.

| ingredients (wt %) | Example (wt %) | | | | | |
|---|---|---|---|---|---|---|
| | 8h | 8i | 8j | 8k | 8l | 8m |
| commercially available, waxy corn starch | 0 | 2 | 0 | 4 | 2 | 3 |
| Example 2b | 4 | 4 | 2 | 2 | 2 | 2 |
| sugar | 10 | 10 | 10 | 10 | 10 | 10 |
| skim milk | 86 | 84 | 88 | 84 | 86 | 86 |
| total | 100 | 100 | 100 | 100 | 100 | 100 |
| Cond.@ 4 hr | T | T | T | S | T | S |
| Cond. @ 8 hr | T | | | | T | S |
| Cond.@ 12 hr | | S | T | S | | |
| Cond. @ 16 hr | T | S | T | S | T | S |
| Cond. @ 20 hr | T | S | T | S | T | S |
| Cond. @ 24 hr | TS > 24 | TS > 24 | T | TSS > 24 | T | TSS > 24 | n/m: not measured
T: Thickened
S: Set (gelling started and products show characteristics of gelling (e.g. peeling off the walls of the container as an intact structure but not self supporting gel yet))
TS > 24: Time to set is larger than 24 hours
SS: Self-Supporting gel
TSS > 24: Time to be self-supporting gel is greater than 24 hours.

Example 9

Preparation of a Delayed Gelling Starch which is a "Double Modified" Sago Starch This was done by (i) converting this starch to a required viscosity, and (ii) stabilizing the starch with propylene oxide. The starch is not cross-linked with phosphorus oxychloride. A slurry was prepared by suspending sago starch (6500 g) in tap water (9750 mL). The temperature of the slurry was adjusted to 42° C. in a hot water bath. The alkalinity was then raised to 30 mL 0.1N HCl (titration to neutrality of a 50 mL sample) by slowly adding a 3% aqueous NaOH solution. Potassium permanganate (16.25 mL of a 0.005 wt % aqueous solution) was added to the solution followed by hydrogen peroxide (15.6 g of 30% hydrogen peroxide). The reaction mixture was held for three hours until no hydrogen peroxide remained, as indicated by a negative test on a hydrogen peroxide QUANT® strip. The resulting starch was found to have a viscosity of 50 mPa·s.

The alkalinity was then increased to 64 mL using 3% NaOH. A portion of the slurry containing 1000 g of the starch was removed and 10 g propylene oxide (1 wt % based in the starch weight) was added and this slurry was added to a 1 gallon plastic bottle. The bottle was then placed in a heated tumbler which was rotated for 16 hours at 40° C. The pH of the starch slurry was then adjusted to 5.5 by addition of sulfuric acid (25 wt %). The starch product was recovered by filtration, washed with water, and air-dried.

Example 10

Delayed Gelling of a Double Modified Sago Starch in a Panna Cotta Type Product Made with Yogurt Process The data in Table 4 summarizes a panna cotta type product preparation study comparing an acid converted gelling starch based on sago with a viscosity about 26 mPa·s and the double modified sago starch of Example 9 ("Exp Mod Sago"). Both formulas have 3.4% protein and 3% fat. The panna cotta type product using the double modified starch developed a gelled texture, while the acid converted starch did not, under the same processing conditions.

TABLE 4

Panna Cotta Formulations And Gelling

| ingredients (wt %) | commerically available thin-boiling sago starch | Example 9 |
|---|---|---|
| skim milk | 80.90 | 78.50 |
| skim milk powder | 1.70 | 2.10 |
| cream 40% | 7.38 | 7.38 |
| sucrose | 7.00 | 7.00 |
| commerically available thin-boiling sago starch | 3.00 | — |
| Example 9 | — | 5.00 |
| panna cotta flavor | as needed | as needed |
| culture | 0.02 | 0.02 |
| total | 100 | 100 |
| protein | 3.40 | 3.46 |
| fat | 3.00 | 3.00 |

Example 11

Procedure for Preparation of a "Double Modified" Pea Starch

This was done by (i) converting the starch to a required viscosity and (ii) stabilizing the starch with propylene oxide. The starch was not cross-linked with phosphorus oxychloride. A slurry was prepared by suspending pea starch (1500 g) in tap water (2250 mL). The temperature of the slurry was adjusted to 42° C. in a hot water bath. The alkalinity was then raised to 28 mL 0.1N HCl (titration to neutrality of a 50 mL sample) by slowly adding a 3% aqueous NaOH solution. Potassium permanganate (3.75 mL of a 0.005 wt % aqueous solution) was added to the solution followed by hydrogen peroxide (7.5 g of 30% hydrogen peroxide). The reaction mixture was held for three hours until no hydrogen peroxide remained, as indicated by a negative test on a hydrogen peroxide QUANT® strip. The resulting starch was found to have a viscosity of 40 mPa·s. The alkalinity was then increased to 68 mL using 3 wt % NaOH. A portion of the slurry containing 1200 g of the starch was removed and propylene oxide (18 g, 1.5 wt % based on the starch weight) was added and the slurry added to a 1 gallon plastic bottle. The bottle was then placed in a heated tumbler which was rotated for 16 hours at 40° C. The pH of the starch slurry was then adjusted to 5.5 by addition of sulfuric acid (25 wt %). The starch product was recovered by filtration, washed with water, and air-dried.

Example 12

Gelling Delay Test for Example 11

The starch of Example 11 (21 g) was added to a beaker and distilled water (289 g) was added. The slurry was then cooked in a boiling water bath for 20 minutes, with stirring for the first 3 minutes. Additional distilled water was then added to correct for weight loss due to evaporation. The cooked starch was then poured into six 2 oz. jars and allowed stand at room temperature. After one hour, one jar was overturned into a plastic weighing dish and carefully lifted vertically. The starch was defined as "gelled" if a self-supporting gel was obtained. This process was repeated after 2, 3, 5, 8, and 24 hours. At 3 hours, a self-supporting gel was obtained.

Example 13

Gelling Delay Test for Control

A similar test as to that of Example 12 was run on a peroxide-thinned pea starch that was not reacted with propylene oxide (as otherwise described for Example 11). A gel formed within 1 hour. Thus, the treatment with a low level of propylene oxide resulted in about a 2 hour delay in the formation of a gel, as per Example 12.

Example 14

Manufacture of a Cup-Set-Like Texture Using a Typical Stirred-Type Yogurt Process with a Double-Modified Sago Starch Skim milk (85.5 wt %), heavy cream (7.5 wt %), non-fat dry milk (1 wt %), and a double modified sago starch (6 wt %; see Example 15 below for the propylene oxide treated sample made as per Example 5) were blended and preheated to 65° C. The preheated blend was then homogenized at 1740 pounds per square inch, and heated to 98° C., and then held for 6 minutes at 95° C. After processing, the yogurt mix was inoculated with a typical yogurt starter culture and fermented for approximately 4 hours, or until the pH reached 4.6. Upon reaching a pH of 4.6, the yogurt was stirred and simultaneously cooled to 4.4° C., after which the yogurt was filled into cups. After several days of cold storage, the yogurt regained the self supporting, cuttable gel texture that would be typically lost after stirring post-fermentation, making it closely resemble cup-set yogurt. The yogurt that was produced here was cuttable, could support its own weight, and would retain its shape upon being removed from the cup after several days of cold storage.

Example 15

Yogurt with a Lower Protein Content than Typical Yogurt Using a Double-Modified Sago Starch A "double modified" sago starch was prepared using the same procedure as described in Example 5, but the starch was converted to a viscosity of 50 mPa·s, and stabilized with a 1.5 wt % propylene oxide treatment. Skim milk (77.7 wt %), heavy cream (7.5 wt %), non-fat dry milk (0.8 wt %), sugar (9 wt %), and the double-modified sago starch (5 wt %) were used. The yogurt was produced using identical processing conditions as to those used in Example 14. After several days of cold storage, the yogurt that was produced, despite being low in protein (3 wt %), was very firm in texture and had a very high spoon cut and indent that would be typically seen with yogurt of much higher protein contents.

Example 16

Use of the Double-Modified Sago Starch from Example 15 as a Gelatin Replacement in Yogurt In commercially available yogurt, gelatin plays a role of being able to increase gel strength and firmness of the yogurt. The following formula was used to produce a gelatin-free yogurt: skim milk (78.8 wt %), heavy cream (7.5 wt %), non-fat dry milk (0.7 wt %), sugar (9 wt %), and the double-modified sago starch (4 wt %). The yogurt was produced using identical processing conditions as to those used in Examples 14 and 15. Despite not containing any gelatin, the yogurt exhibited increased gel strength and firmness compared to a standard yogurt made without gelatin.

Example 17

Effects of Viscosity (Degree of Conversion) and Propylene Oxide Treatment Levels on Sago that was Double-Modified as Per Example 5

All samples were analyzed for their gelling rate by the procedure given in Example 11. The non-hydroxypropylated

TABLE 5

| sample no. | viscosity (mPa·s) | % bound hydroxpropyl | hours to gel |
|---|---|---|---|
| 17-1 | 60 | 1.13 | 24 |
| 17-2 | 40 | 0.96 | 11 |
| 17-3 | 60 | 0.81 | 8 |
| 17-4 | 40 | 0.72 | 5 |
| 17-5 | 40 | 0.9 | 8 |
| 17-6 | 60 | 0.96 | 11 |

TABLE 5-continued

| sample no. | viscosity (mPa·s) | % bound hydroxpropyl | hours to gel |
|---|---|---|---|
| 17-7 | 80 | 1.22 | 56 |
| 17-8 | 80 | 0.7 | 8 |
| 17-9 | 80 | 0.96 | 11 | sago bases all gelled within 1 hour of cooking as shown in Table 5. Reacting these bases with a low level of stabilization agent, i.e. from hydroxypropylation, produced sago compositions exhibiting a wide range of gelling times (from 5 hours to 56 hours).

Example 18

Preparation of a "Double Modified" Mung Bean Starch

This was done by (i) converting this starch to a required viscosity and (ii) stabilizing the starch with propylene oxide. This starch was not cross-linked with phosphorus oxychloride. A slurry was prepared by suspending mung bean starch (1000 g) in tap water (1250 mL). The temperature of the slurry was adjusted to 41.1° C. in a hot water bath. The initial pH was recorded at 3.96 and approximately two drops of 30% hydrogen peroxide was used to bring the reaction mixture to a slightly positive KI.

After obtaining a slightly positive KI result, the alkalinity was then raised to 33.17 mL 0.1N HCl (titration to neutrality of a 50 mL sample) by slowly adding a 3% aqueous NaOH solution. To this mixture, potassium permanganate (2.5 g of a 2 wt % aqueous solution) was added and the resulting mixture allowed to stir for 15 minutes. To the stirred mixture was added hydrogen peroxide (12 g of 30% hydrogen peroxide) which was allowed to mix for an addition 2 hours until complete consumption of the hydrogen peroxide occurred, as indicated by a negative KI. An aliquot (150 mL) of the slurry was removed, neutralized, recovered, dried, and the viscosity was determined to be 159 mPa·s. The alkalinity was re-adjusted using 65 g of 3 wt % NaOH solution to bring the pH to 11.21 and three additional grams of 30% hydrogen peroxide were added to the starch slurry and allowed to react until no oxidizing substances remained. An aliquot (150 mL) of the slurry was removed, neutralized, recovered, dried, and the viscosity was determined to be 62 mPa·s.

Sodium sulfate (180 g) was added to the starch slurry. The alkalinity of the reaction mixture was then raised using a 3% NaOH solution (300 g) to a 71.39 mL titer of 0.1N HCl. Addition of about 10 drops of $H_2SO_4$ (25 wt %) adjusted the pH to 11.2. The slurry was then transferred to a 1 gallon plastic bottle and propylene oxide (15 g, 1.50 wt % based on starch) was added to the slurry. The bottle was then placed in a heated tumbler which was rotated for sixteen hours at 40° C. The slurry was then removed from the tumbler and the pH was adjusted to 3.25 with $H_2SO_4$ (25%) and allowed to mix for one hour. The reaction mixture was then treated with 30% hydrogen peroxide (1 g, 0.1 wt % based on starch) and allowed to mix for one hour. The mixture was then neutralized with sodium metabisulfite (1 g) and adjusted to a final pH of 5.74. The starch was recovered by vacuum filtration, washed with water, and dried in an oven overnight at 29° C.

Example 19

Lemon Flavored Pie Filling

Two "double modified" sago starches were that converted to a viscosity 41 and 63 mPa·s, respectively and stabilized with a 3 wt % acetic anhydride treatment. Lemon juice (19 wt %), sugar (50.5 wt %), water (23.25 wt %), and the double-modified sago starches (7.25 wt %) were used. Also as a control 7.25% a commericially available thin-boiling sago starch containing sample was also made. The thin-boiling sago starch formed a firm gel at 2 hours (upon cooling) while the experimental starches displayed a delayed gelling. After 24 hours and 48 hours both the experimental samples became significantly firmer forming self supporting gels.

Example 20

Delayed Gelling of Non-Sago Starches

Delayed gelling compositions of non-sago starches were prepared, matching the treatments given to the delayed gelling sago type. The non-sago starches that were used were: pea, sweet potato, and mung bean. The pea starch derivative was prepared according to Example 11, and a gelling delay test was conducted according to Example 12. Treatment of a degraded pea starch base material with a low level of propylene oxide (1.5 wt % in this case) resulted in about a 2-3 hour gelling, time in comparison to a sample of the pea starch base without modification with propylene oxide, which gelled within 1 hour.

Sweet potato starch was prepared, in the same manner as the pea starch. When evaluated for gelling delay, a gel formed after 24 hours. This is in contrast to the sweet potato intermediate samples (i.e. no propylene oxide), which exhibit gelling with a self-supporting gel beginning to form at about 2 hours.

A mung bean starch sample was prepared according to Example 18. A gelling delay test was then run in the same manner as described earlier. The sample prepared with 1.50 wt % propylene oxide at a 62 mPa·s viscosity (via Manox), began to exhibit gelling at about 24 hours, whereas an intermediate without propylene oxide modification exhibited near immediate formation of gel within one hour.

Example 21

Delayed Thickening

The delayed gelling starch was evaluated in a fruit prep model system. A mixture of a hydroxypropylated, cross linked waxy corn starch and the hydroxypropylated, double modified sago starch was compared to the hydroxypropylated, cross linked waxy corn starch alone to determine if delayed thickening was exhibited. The ingredients in Table 6 were treated as follows. About ⅓ of the water and ⅔ of the sugar were mixed in a beaker. The starch or starch mixture were slurried in the remaining water and added to water/sugar mixture. The resulting mixture was poured into a Thermomix kitchen appliance, heated to 90° C. at speed 1 and held for 200 minutes. The remaining sugar was added, the mixture cooled to 66° C., and using a Brookfield viscometer the viscosity was determined. The viscosity was determined again after cooling for 4 hours at room temperature and yet again after

TABLE 6

Delayed Gelling Fruit Prep Model System

| ingredients (wt %) | PO/POCl$_3$ waxy corn starch | 1.25% PO on 80 mPa·s sago starch base |
|---|---|---|
| water | 46 | 43 |
| granulated sugar | 50 | 50 |

TABLE 6-continued

Delayed Gelling Fruit Prep Model System

| ingredients (wt %) | PO/POCl₃ waxy corn starch | 1.25% PO on 80 mPa·s sago starch base |
|---|---|---|
| PO/POCl₃ waxy corn starch | 4 | 2 |
| 1.25% PO on 80 mPa·s sago starch base | 0 | 5 |
| total | 100 | 100 |
| hot cook viscosity, 66° C. (mPa·s) | 18,640 | 2,380 |
| cold cook viscosity, 22° C., 4 hours (mPa·s) | 35,960 | too thick to measure |
| O/N viscosity, 22° C., 24 hours (mPa·s) | 35,320 | too thick to measure |

24 hours. Results shown in Table 6 show the double modified starch provides a thin hot viscosity with delayed thickening on cooling. This delayed thickening would be beneficial in food systems such as retorted soup where low hot viscosity would allow for faster heat penetration, resulting in manufacturing savings for the customer. It could also allow for easier pumping and filling of foods such as fruit preps which are high in viscosity.

Comparative Example 1

Procedure for the preparation of a "double modified" corn starch (non-gelling), by (i) conversion to 40-50 mPa·s viscosity, and (ii) stabilization with 2% propylene oxide. A slurry was prepared by suspending corn starch (1000 g) in tap water (1500 mL). The temperature of this slurry was adjusted to 42° C. in a hot water bath. The alkalinity was then raised to 30 mL 0.1N HCl (titration to neutrality of a 50 mL sample) by slowly adding a 3% aqueous NaOH solution. Potassium permanganate (2.5 g of a 2% aqueous solution) was added to the solution followed by hydrogen peroxide (1.75 g of 30% hydrogen peroxide). The reaction mixture was held for three hours until no hydrogen peroxide remained, as indicated by a negative test on a hydrogen peroxide QUANT® strip. The resulting starch was found to have a viscosity of 40-50 mPa·s.

The alkalinity of a solution of the starch was then increased to 64 mL using 3 wt % NaOH. Sodium sulfate (60 g, 6 wt % on starch weight), and propylene oxide (20 g, 2% on starch weight) were added and the slurry added to a 1 gallon plastic bottle. The bottle was then placed in a heated tumbler which was rotated for 16 hours at 40° C. The pH of the starch slurry was then adjusted to 5.5 by addition by addition of sulfuric acid (25 wt %). The starch product was recovered by filtration, washed with water, and air-dried. The resulting double modified corn starch did not gel.

Comparative Example 2

Procedure for the preparation of a non-gelling "double modified" tapioca starch by (i) conversion to a 40-50 mPa·s viscosity and (ii) stabilization with 2% propylene oxide. A slurry was prepared by suspending tapioca starch (1000 g) in tap water (1500 mL). The temperature of this slurry was adjusted to 42° C. in a hot water bath. The alkalinity was then raised to 30 mL 0.1N HCl (titration to neutrality of a 50 mL sample) by slowly adding a 3% aqueous NaOH solution. Potassium permanganate (2.5 g of a 2% aqueous solution) was added to the solution followed by hydrogen peroxide (0.32 g of 30% hydrogen peroxide). The reaction mixture was held for three hours until no hydrogen peroxide remained, as indicated by a negative test on a hydrogen peroxide QUANT® strip. The resulting starch was found to have a viscosity of 40-50 mPa·s.

The alkalinity was then increased to 64 mL using 3 wt % NaOH. Sodium sulfate (60 g, 6 wt % on starch weight), and propylene oxide (20 g, 2% on starch weight) were added and the slurry added to a 1 gallon plastic bottle. The bottle was then placed in a heated tumbler which was rotated for 16 hours at 40° C. The pH of the starch slurry was then adjusted to 5.5 by addition by addition of sulfuric acid (25 wt %). The starch product was recovered by filtration, washed with water, ad air-dried. The resulting double modified tapioca starch did not gel.

Throughout this application, various publications are referenced. The disclosures of these publications in their entireties are hereby incorporated by reference into this application in order to more fully describe the state of the art as known to those skilled therein as of the date of the application described and claimed herein.

While particular embodiments of the present application have been illustrated and described, it would be obvious to those skilled in the art that various other changes and modifications can be made without departing from the spirit and scope of the application. It is therefore intended to cover in the application all such changes and modifications that are within the scope of this application.

What is claimed is:

1. A gelling composition comprising:
   a fluid;
   from about 0.25 wt % to about 6 wt % of a delayed gelling starch comprising a reaction product of a converted starch base material and a stabilization agent; and
   from 0 wt % to about 5 wt % of a viscosifier;
   wherein:
   the gelling composition sets to a gel and exhibits a delay in gelling of at least 1 hour compared to the same gelling composition in which the delayed gelling starch has been replaced with the same converted starch base but without the stabilization agent; and
   the total wt % of the delayed gelling starch and the viscosifier does not exceed about 6 wt %.

2. The gelling composition of claim 1, wherein the delayed gelling starch is cross-linked with a cross-linking agent.

3. The gelling composition of claim 2, wherein the cross-linking agent comprises epichlorohydrin, a linear dicarboxylic acid anhydride, phosphorus oxychloride, acrolein, or a soluble metaphosphate.

4. The gelling composition of claim 1, wherein the gelling composition comprises 0 wt % of the viscosifier and from about 3 wt % to about 4 wt % of the delayed gelling starch.

5. The gelling composition of claim 1, wherein the gelling composition comprises from about 0.25 wt % to about 5 wt % of the viscosifier and from about 0.25 wt % to about 4 wt % of the delayed gelling starch.

6. The gelling composition of claim 1, wherein the stabilization agent comprises propylene oxide or acetic anhydride.

7. The gelling composition of claim 1, wherein the converted starch base material comprises a starch that has been reacted with an acid.

8. The gelling composition of claim 7, wherein the starch comprises sago starch, mung bean starch, sweet potato starch, or pea starch.

9. The gelling composition of claim 7, wherein the starch comprises a sago starch.

10. The gelling composition of claim 1, wherein the converted starch base material has a viscosity of from about 20 mPa·s to about 400 mPa·s as measured in the Bohlin viscosity test.

11. The gelling composition of claim 1, wherein the viscosifier comprises waxy starch, cross-linked waxy starch, cross-linked and substituted waxy starch, acetylated starch, hydroxypropylated starch, or hydrocolloid.

12. The gelling composition of claim 1 which is a comestible.

13. A delayed gelling starch comprising a reaction product of a converted starch base material and a stabilization agent, wherein a composition comprising the delayed gelling starch sets to a gel and exhibits a delay in gelling of at least 1 hour compared to a composition in which the delayed gelling starch has been substituted with the same converted starch base but without the stabilization agent.

14. The delayed gelling starch of claim 13, wherein the stabilization agent comprises propylene oxide or acetic anhydride.

15. The delayed gelling starch of claim 13, wherein the converted starch base material comprises a starch that has been reacted with an acid.

16. The delayed gelling starch of claim 15, wherein the starch comprises from about 15 wt % to about 80 wt % amylose.

17. The delayed gelling starch of claim 15, wherein the starch comprises sago starch, mung bean starch, sweet potato starch, or pea starch.

18. The delayed gelling starch of claim 13, wherein the converted starch base material has a viscosity of from about 20 mPa·s to about 400 mPa·s as measured in the Bohlin viscosity test.

19. A comestible comprising the delayed gelling starch of claim 13.

* * * * *